(12) United States Patent
Ensminger et al.

(10) Patent No.: US 11,985,921 B2
(45) Date of Patent: May 21, 2024

(54) TWINE TENSION ASSEMBLY

(71) Applicant: AGCO Corporation, Duluth, GA (US)

(72) Inventors: Nathan K. Ensminger, South Hutchinson, KS (US); Bernard Dean Regier, Hesston, KS (US); Dino Rey Valdez, Hesston, KS (US); Maynard M. Herron, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 586 days.

(21) Appl. No.: 17/365,908

(22) Filed: Jul. 1, 2021

(65) Prior Publication Data

US 2022/0000037 A1 Jan. 6, 2022

Related U.S. Application Data

(60) Provisional application No. 63/046,820, filed on Jul. 1, 2020.

(51) Int. Cl.
*A01F 15/14* (2006.01)
*B65B 13/26* (2006.01)
*B65B 27/12* (2006.01)

(52) U.S. Cl.
CPC .......... *A01F 15/148* (2013.01); *A01F 15/145* (2013.01); *B65B 13/26* (2013.01); *B65B 27/12* (2013.01)

(58) Field of Classification Search
CPC ...... A01F 15/14; A01F 15/141; A01F 15/145; A01F 15/146; A01F 15/148; B65B 13/24; B65B 13/26
See application file for complete search history.

(56) References Cited

U.S. PATENT DOCUMENTS

| | | | | |
|---|---|---|---|---|
| 8,671,834 B1 * | 3/2014 | Rotole | .................. | B65H 69/04 |
| | | | | 100/32 |
| 2015/0305247 A1* | 10/2015 | Chaney | ................. | A01F 15/148 |
| | | | | 702/150 |

FOREIGN PATENT DOCUMENTS

| | | |
|---|---|---|
| GB | 2321425 A | 7/1998 |
| WO | 2010/136501 A1 | 12/2010 |
| WO | WO-2010136501 A1 * | 12/2010 ......... A01F 15/0825 |

OTHER PUBLICATIONS

UK Intellectual Property Office, Search Report for related UK Application No. 2013255.1, dated Jan. 10, 2021.

* cited by examiner

*Primary Examiner* — Bobby Yeonjin Kim

(57) ABSTRACT

A baler twine tension measurement assembly including a displacement detector and elements defining a first twine path. The first twine path extends between a first location and a second location which is angularly displaceable with respect to the first location. The displacement detector operates to generate a signal indicative of the angular displacement of the second location with respect to the first location.

17 Claims, 14 Drawing Sheets

TWINE TENSION ASSEMBLY

CROSS-REFERENCE TO RELATED APPLICATIONS

This application claims the benefit of the filing date of U.S. Provisional Patent Application 63/046,820, filed Jul. 1, 2020, the entire disclosure of each of which is incorporated herein by reference.

FIELD OF THE INVENTION

The present invention relates to a baling apparatus, in particular to a baling apparatus for producing square bales, and in particular to a mechanism for detecting tension in a strand or strands of baling or binding twine being fed to a knotter assembly when producing square bales and so preventing an excess of tension in such twine(s). The present invention also relates a baler incorporating a plurality of such assemblies.

BACKGROUND

Rectangular bales are able to maintain their shape by means of a series of parallel extending twine loops, provided lengthwise around the bales. Current large square balers are equipped with a plurality of twine tensioners each associated with a plurality of knotter assemblies to maintain proper tension on the twine to ensure each knotter assembly performs properly. The twine is drawn from suitable twine boxes. If the twine tensioner fails to maintain proper tension on the twine, the twine can be pulled out of the knotter assembly and a mis-tie occurs. A number of factors affect the tension on the twine. Sometimes twine gets tangled in the twine box restricting twine supply from the twine box which makes it difficult or impossible for the baler to make knots. In extreme situations the tension in the twine is sufficient to cause bending of the baler needles and also to interfere with the other baler components which may become damaged as a result. Once the baler needles become bent, functioning of the knotter mechanism is significantly impaired causing operational downtime of the baler until repairs may be effected.

It is further a problem that an operator of the baler will not know there is a problem until the knot has been missed or damage to baler components has occurred.

It is an advantage of the present invention that it seeks to address these problems.

BRIEF SUMMARY

According to a first aspect of the present invention, a baler twine tension measurement assembly comprises a displacement detector and elements defining a first twine path, the first twine path extending between a first location and a second location angularly displaceable with respect to the first location, the displacement detector being operable to generate a signal indicative of the angular displacement of the second location with respect to the first location.

Preferably, the first location comprises a first pulley located at a first end of an elongate element and the second location comprises a second pulley located on the elongate element, spaced from the first pulley.

Preferably, the first twine path further extends between the second location and a third location spaced from the second location.

Preferably, the third location comprises a third pulley located on the elongate element, spaced from the first pulley and the second pulley.

Preferably the baler twine tension measurement assembly further comprises a biased armature guided by movement of the elongate element, the biased armature being connected to the displacement detector.

Preferably the displacement detector comprises a potentiometer.

Preferably the biased armature is biased towards a first position by a biasing element extending between a mounting position and a free end of the armature.

More preferably the biasing element is a helical spring.

Preferably the baler twine tension measurement assembly further comprises additional twine paths provided in parallel to the first twine path, each additional twine path extending between a first fixed location and an associated second displaceable location angularly displaceable with respect to the first fixed location, the displacement detector being operable to generate a signal indicative of the furthest angular displacement of any displaceable location.

According to a second aspect of the invention a twine tension control system comprises a twine tension measurement assembly in accordance with the first aspect of the present invention, a controller to receive the signal from the twine tension measurement assembly and a knife mechanism actuable in response to a predetermined displacement of the first location away from a first position.

This has as an advantage that should the or one of the second displaceable locations be moved to the predetermined position under the action of strand of twine in the twine path, the predetermined position representing a tension in a strand of twine corresponding to or exceeding a predetermined threshold, a knife element is actuated to cross the strand of twine thereby cutting the strand of twine and so avoiding damage to the knotter mechanism and its component parts by a tension in the twine exceeding this threshold level.

Preferably the bale twine tension measurement assembly further comprises a plurality of housings including guide channels, guide means aligned with the first location being adapted for movement with the guide channels.

More preferably, the bale twine tension measurement assembly further comprises second biasing means to bias the first location to the first position.

According to a third aspect of the invention, in a combination comprising an agricultural vehicle and a baler towed by the agricultural vehicle, the baler comprising a plurality of knotter assemblies, and one or more twine tension measurement assemblies according to the first aspect of the invention associated with one or more of the plurality of knotter assemblies.

Preferably, the combination further comprises a control unit, a memory in communication with the control unit, and a user terminal in communication with the control unit, the control unit being configured to receive the signals issued by each baler twine tension control assembly, to compare the signals against a predetermined set of values stored in the memory to determine a terminal signal to be sent the user terminal to cause the user terminal to signal the status of the twine tension measurement assembly that caused the terminal signal to be generated.

This has as an advantage that the operator can determine which twine path or set of twine paths may require remedial attention.

More preferably the control unit is configured to compare the signals against a predetermined set of values stored in the memory and in the event of one of the signals issued by each baler twine tension control assembly corresponding to a cut-off value, the control also causes a cut-off signal to be sent to cause operation of the baler to cease.

Preferably the user terminal signals which tension measurement apparatus caused the terminal signal to be generated by way of a visual and/or an audible indication.

Preferably, the control unit comprises a processor located on the baler. Alternatively the control unit comprises a processor on the baler in communication with a processor on the agricultural vehicle. Alternatively, the control unit comprises a processor located on the agricultural vehicle.

According to a fourth aspect of the invention, a computer implemented method comprises the steps of a control unit receiving a plurality of signals, the signals including signals representing a tension in one or more strands of twine in a twine measurement assembly, comparing the signals representative of the tension in the one or more strands of twine against a predetermined set of values stored in the memory, and generating a terminal signal to a user terminal to cause the user terminal to signal the status of the twine tension measurement assembly that caused the terminal signal to be generated.

According to a fifth aspect of the present invention, a computer readable program comprises instructions that cause one or more processors to implement the method of the third aspect of the invention.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal and transverse are made with respect to a longitudinal vehicle axis which is parallel to a normal forward direction of travel. References to terms such as horizontal and vertical are made with respect to the apparatus being located on level, non-sloping ground.

Figure 1:
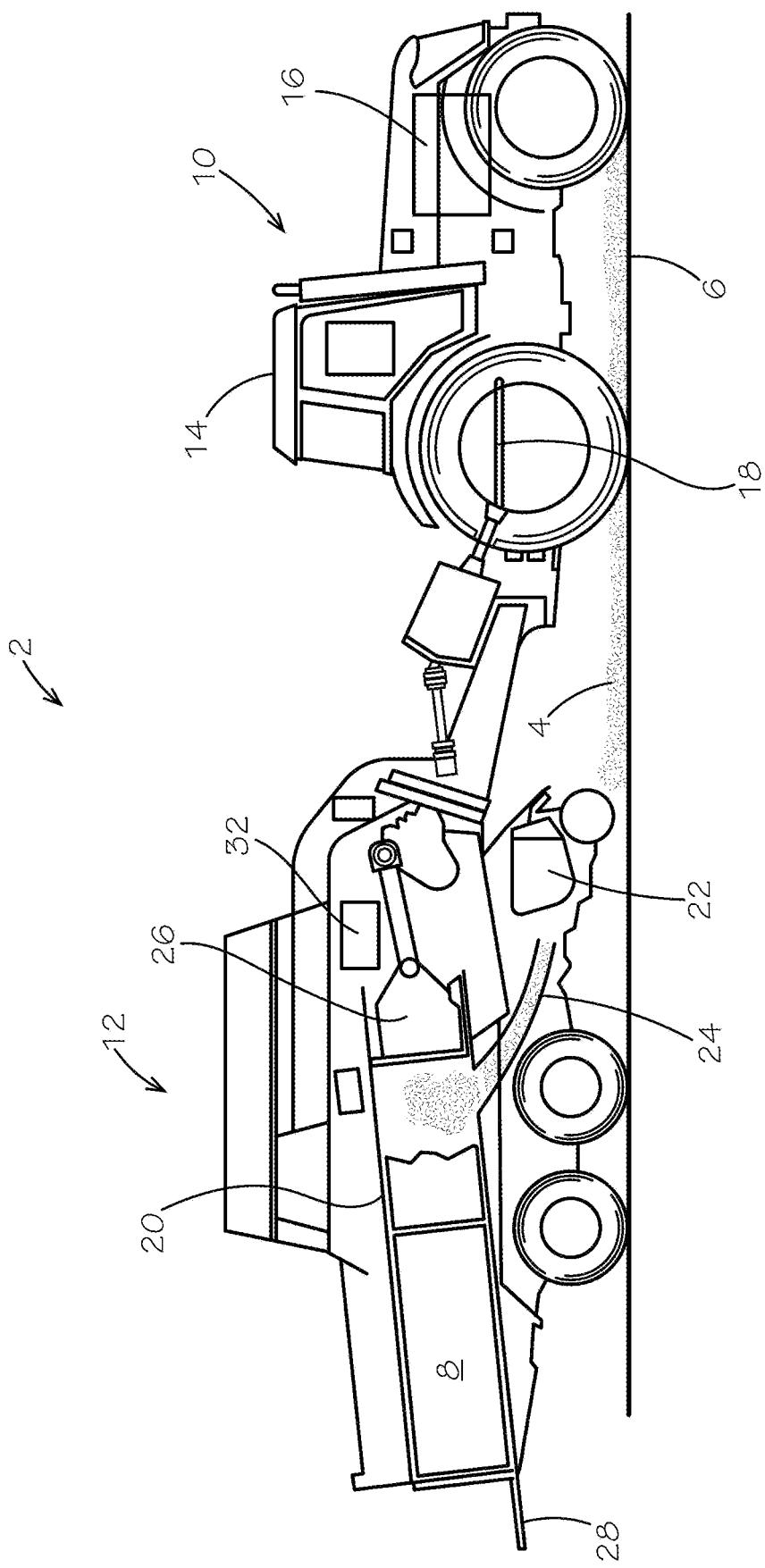
FIG. 1 shows a tractor and baler combination for use with the present invention.
Figure 2:
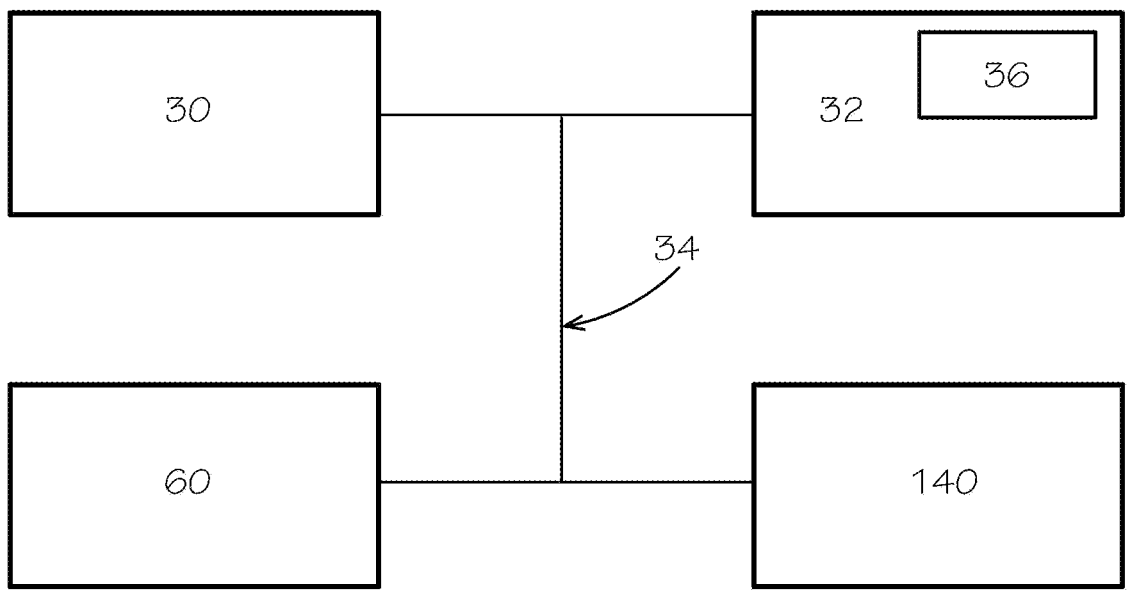
FIG. 2 shows a schematic diagram of baler elements for use with the present invention.

With reference to FIG. 1, a semi-schematic diagram of an agricultural baler system 2 is shown in which the invention may be employed while baling loose crop material 4 from the ground 6 into formed bales 8. The baler system includes a towing vehicle 10 and a baler 12. The towing vehicle 10 may include a cab 14 wherein an operator may be located, an engine 16 operable to move the towing vehicle, and a power take-off (PTO) 18 operable to transfer mechanical power from the engine 16 to the baler 12. The baler 12 is hitched to the towing vehicle in any suitable manner, and power for operating the various mechanisms of the baler 12 may be supplied by the PTO of the towing vehicle 10. One having ordinary skill in the art should appreciate in the context of the present disclosure that the example baler 12 is merely illustrative.

The baler 12 has a baling chamber 20 within which bales of crop material are formed. The baler is depicted as an "in-line" type of baler wherein the loose crop material 4 is picked up by a pickup assembly 22 and then loaded up into the baling chamber 20 by way of a stuffer chute assembly 24 including a charge forming stuffer chamber.

In the illustrated embodiment, the baler 12 is an "extrusion" type baler in which the bale discharge orifice at the rear of the baler 12 is generally smaller than upstream portions of the baling chamber 20 such that the orifice restricts the freedom of movement of a previous charge and provides back pressure against which a reciprocating plunger 26 can act within the baling chamber 20 to compress charges of crop materials to form the next bale. The dimensions of the discharge orifice and the squeeze pressure on the bales at the orifice are controlled by a compression mechanism as is understood by one skilled in the art.

The reciprocating plunger 26 presses newly introduced charges of crop material against a previously formed and tied bale to form a new bale. This action also causes both bales to intermittently advance toward a rear discharge orifice of the baler 12. The completed bales 8 are tied with binding material, for example twine. Once tied, the bales are discharged from the rear end of the bale-forming chamber onto a discharge platform in the form of a chute 28.

A user terminal 30 communicates with an electronic control unit 32. The electronic control unit 32 is also be in electronic or other communication with various components and devices of the baler (and/or the towing vehicle). Conveniently such communication may be enabled by way of a suitable data communication network 34 such as one compliant with the ISOBUS standard (a network in conformance to ISO 11783). For example, the electronic control unit may be in electronic communication with various actuators, sensors, and other devices within (or outside of) the baler. The electronic control unit 32 may communicate with various other components (including other controllers) in various known ways, including wirelessly.

Various alternative locations for the electronic control unit may be utilized, including locations on the towing vehicle. It will be understood that one or more electronic control units may be employed and that the electronic control unit(s) 32 may be mounted at various locations on the towing vehicle, baler, or elsewhere. The electronic control unit(s) may be a hardware, software, or hardware and software computing device, and may be configured to execute various computational and control functionality with respect to the baler (or towing vehicle).

The electronic control unit 32 is also able to access a suitable memory 36. The memory 36 may take any suitable form and is in electronic communication with the electronic control unit 32. The memory 36 is adapted to store, in any suitable manner such as a database or look up table, reference values for a desired parameter.

The baler 12 is provided with a plurality of knotter assemblies. In use, in order to provide a strand of twine to each knotter assembly, a strand of twine is drawn from a supply roll provided in a twine box located to a side of the baler 12 through a plurality of twine guides provided in a frame of the baler 12 and through a final twine guide associated with a knotter assembly to a tensioner of the associated knotter assembly. As is known the baler comprises a plurality of knotter assemblies and some of the knotter assemblies are supplied with strands of twine from supply rolls located to a first side of the baler and the others are supplied with strands of twine from supply rolls located to a second side of the baler.

Each knotter assembly is configured to take strands of twine looped around a formed bale and bind the strands with two knots. During the bale knotting cycle of the baler, needles of each knotter assembly abruptly pull lengths of the twine from at least certain of the supply rolls in order to feed the twine to the knotter assembly. In extreme situations, the twine gets tangled in the twine box and the resulting tension in the strand of twine is sufficient to cause bending of the needles and also to interfere with the other baler components which may become damaged as a result.

By introducing a twine tension measurement assembly (FIGS. 3 to 6; FIGS. 7 to 13) in the path of each of the strands of twine, this problem can be addressed. While reference is made to a strand of twine, it will be understood that the invention is equally suitable for use with strands of other binding material. It will be recognised that in the discussion of the embodiments below that certain elements have been omitted from some of the Figures for reasons of clarity. As between the embodiments like reference numerals have been used to refer to like parts.

Figure 3:
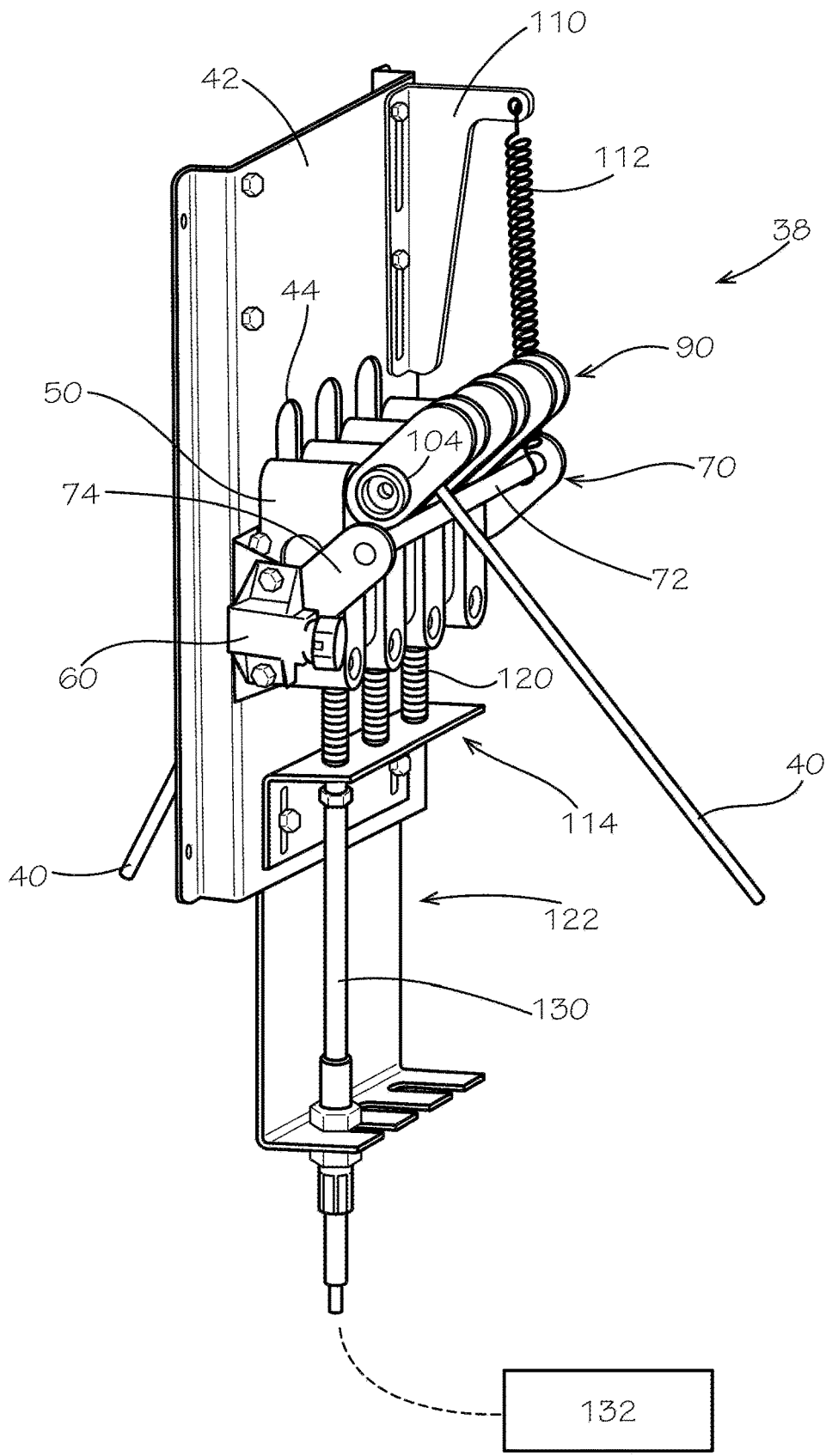
FIG. 3 shows a first perspective view of a first embodiment of a twine tension measurement assembly in accordance with the present invention in which a strand of twine is running at a relaxed tension.

Referring first to FIGS. 3 to 6, a first embodiment of a baler twine tension measurement assembly 38 is shown. In FIG. 3 the baler twine tension measurement assembly 38 is shown in a first tension released position in which the elements of the baler twine tension measurement assembly 38 are in an initial position. A strand of twine 40 is shown extending through the twine tension measurement assembly 38. The baler twine tension measurement assembly 38 comprises a number of elements mounted directly or indirectly to a mounting bracket 42. The mounting bracket 42 comprises a generally planar front vertical portion with left and right hand side L-shaped flanges extending along either side of the generally planar front vertical portion. The mounting bracket 42 may conveniently be secured to part of the frame of the baler 12 by way of the left and right hand side flanges in any suitable manner.

The generally planar front vertical portion is provided with a number of keyhole shaped apertures 44. As may best be seen in FIG. 10, in the illustrated embodiments, each aperture 44 comprises an upper generally circular portion 46 above a linear vertically extending channel 48. Vertically extending housings 50 are secured in any suitable manner to the mounting bracket 42 to each side of the vertically extending channel 48 of each aperture 44. Preferably the vertically extending housings 50 comprise a plastics material. The upper ends of the housings 50 are generally coterminous with a lower region of the circular portions 46 of the adjacent apertures 44. In the illustrated embodiments, four such housings 50 are shown.

Each of the housings 50 is provided with channels or guide tracks 88. The guide tracks extend substantially vertically and are located in each of the left and right hand side walls of the housings 50. Preferably the guide tracks 88 extend through the side walls.

To each side of the aligned vertically extending housings 50 first and second support brackets 52,54 are provided secured to the mounting bracket 42 in any suitable manner.

Figure 8:
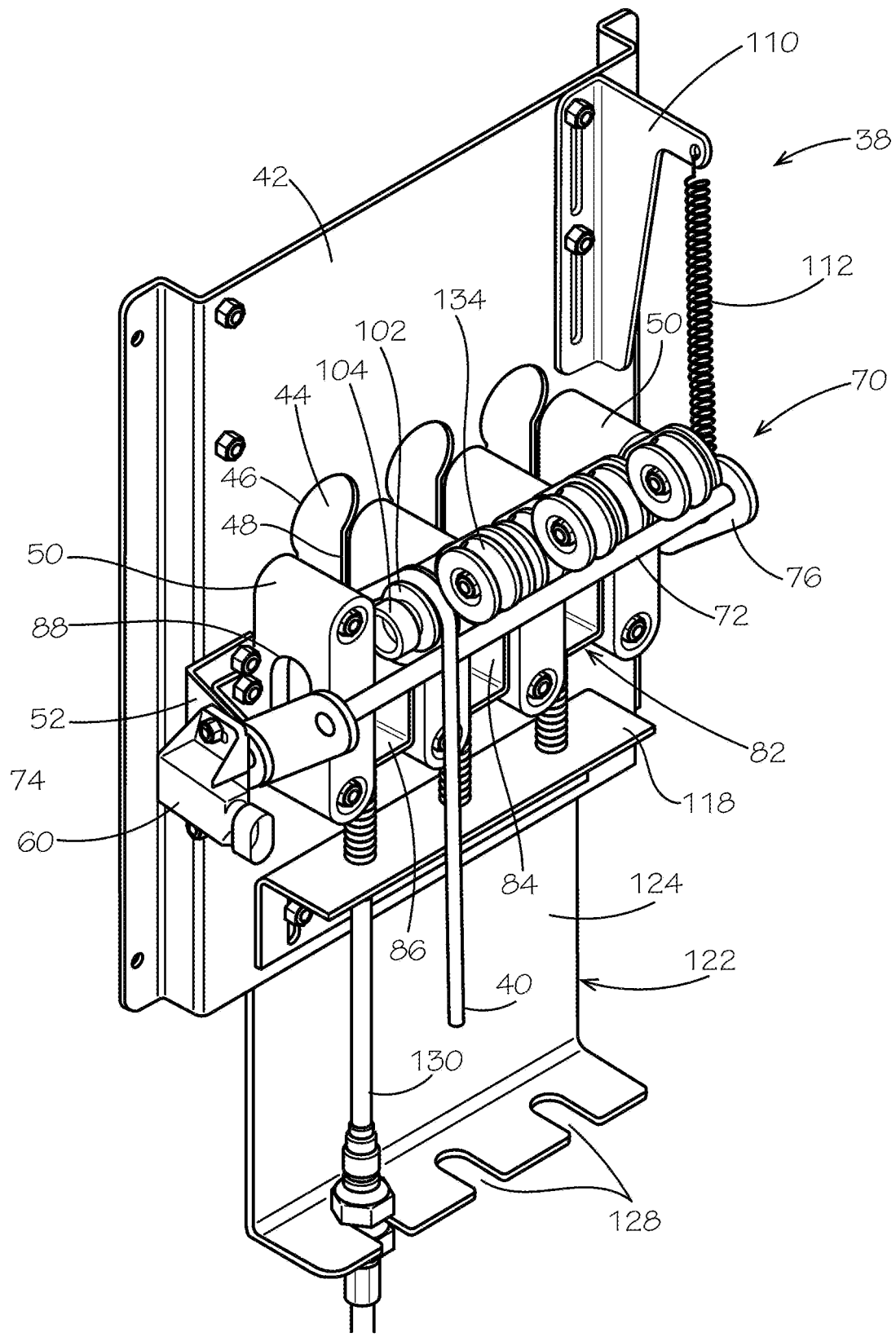
FIG. 8 shows a perspective view of the twine tension measurement assembly of FIG. 7 in which the strand of twine is running at a relaxed tension level.
Figure 9:
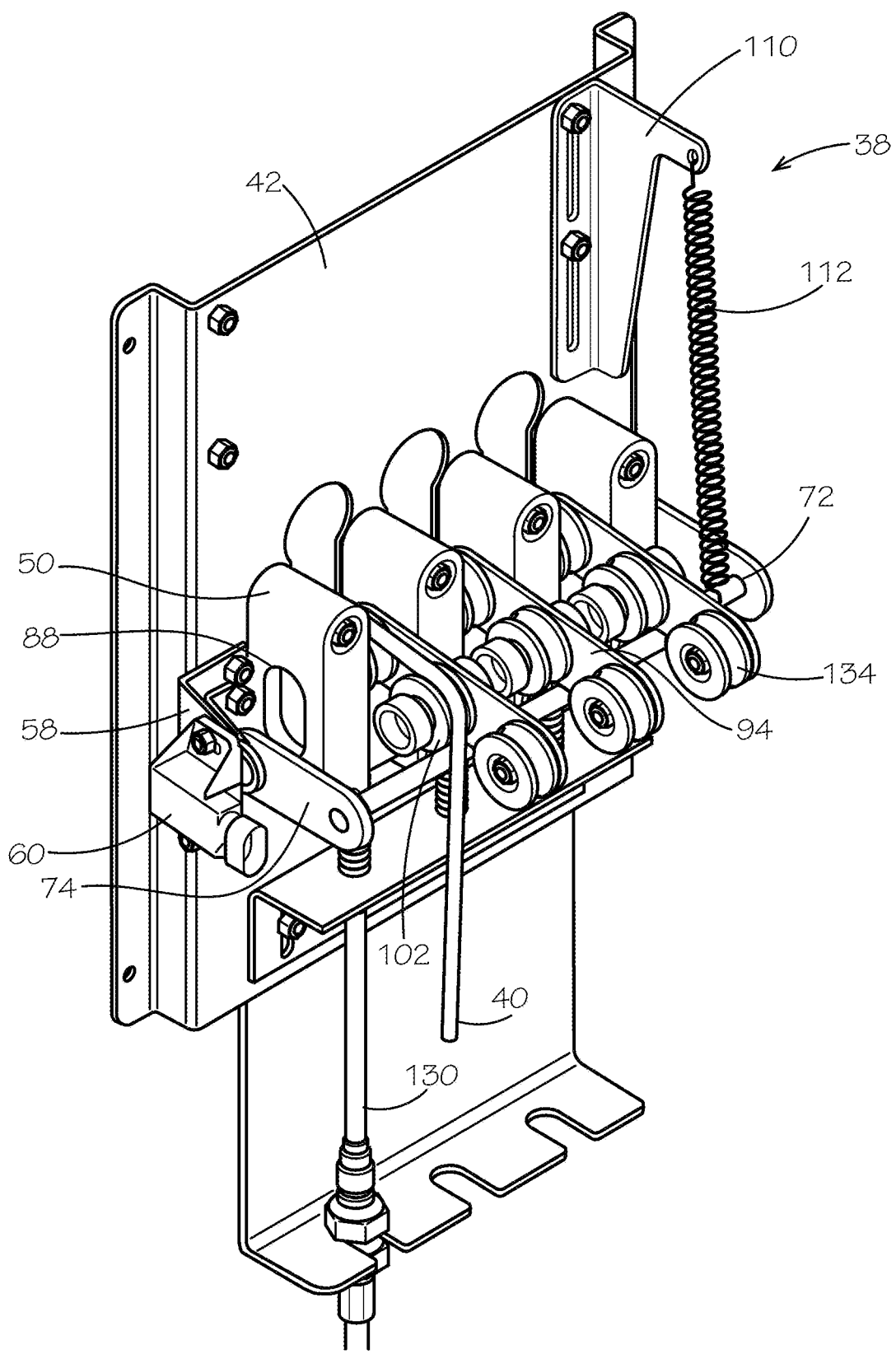
FIG. 9 shows a perspective view of the twine tension measurement assembly of FIG. 7 in which the strand of twine is running at a medium tension level.
Figure 10:
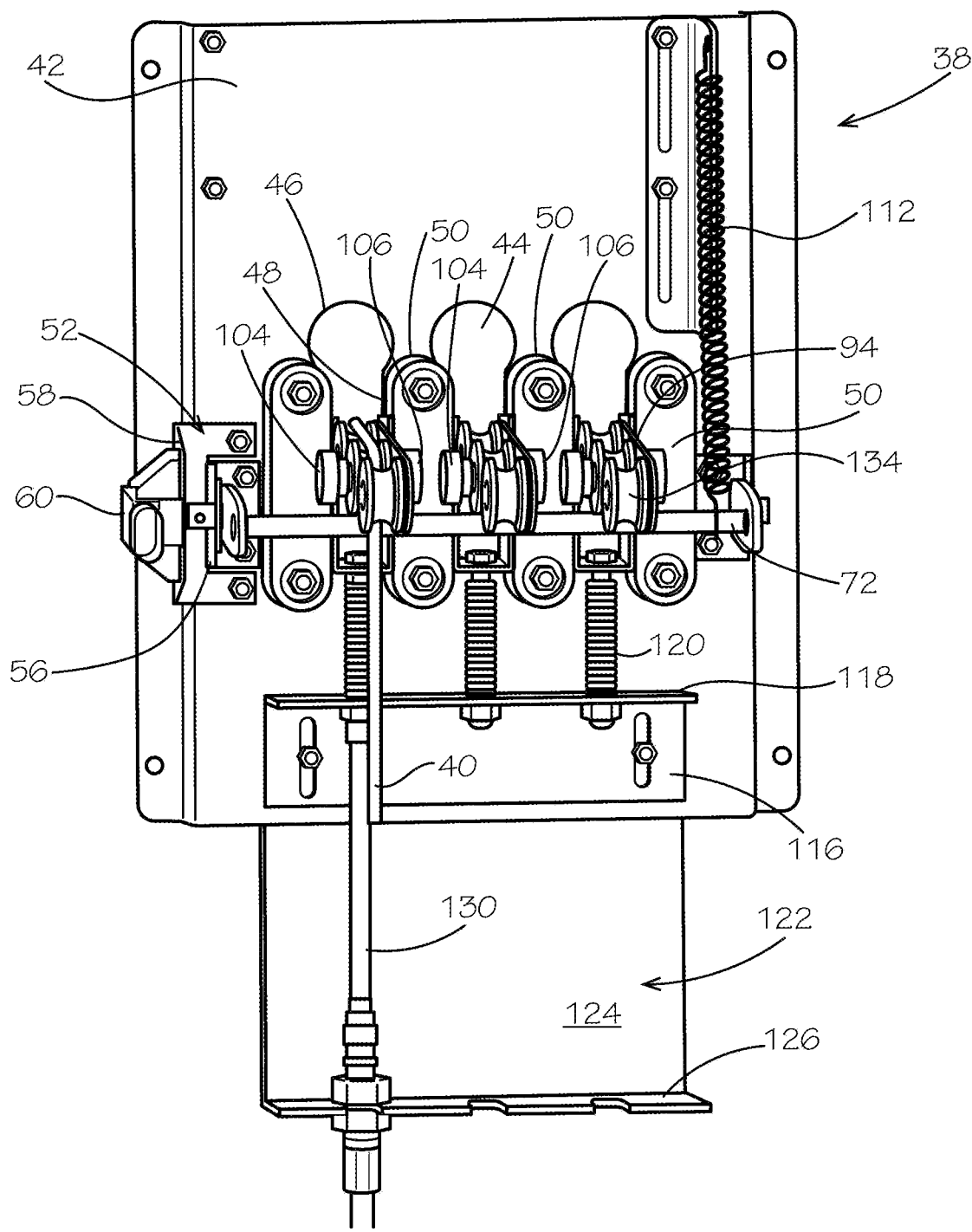
FIG. 10 shows a generally frontal view of the twine tension measurement assembly of FIG. 7 in which the strand of twine is running at a medium tension level.
Figure 11:
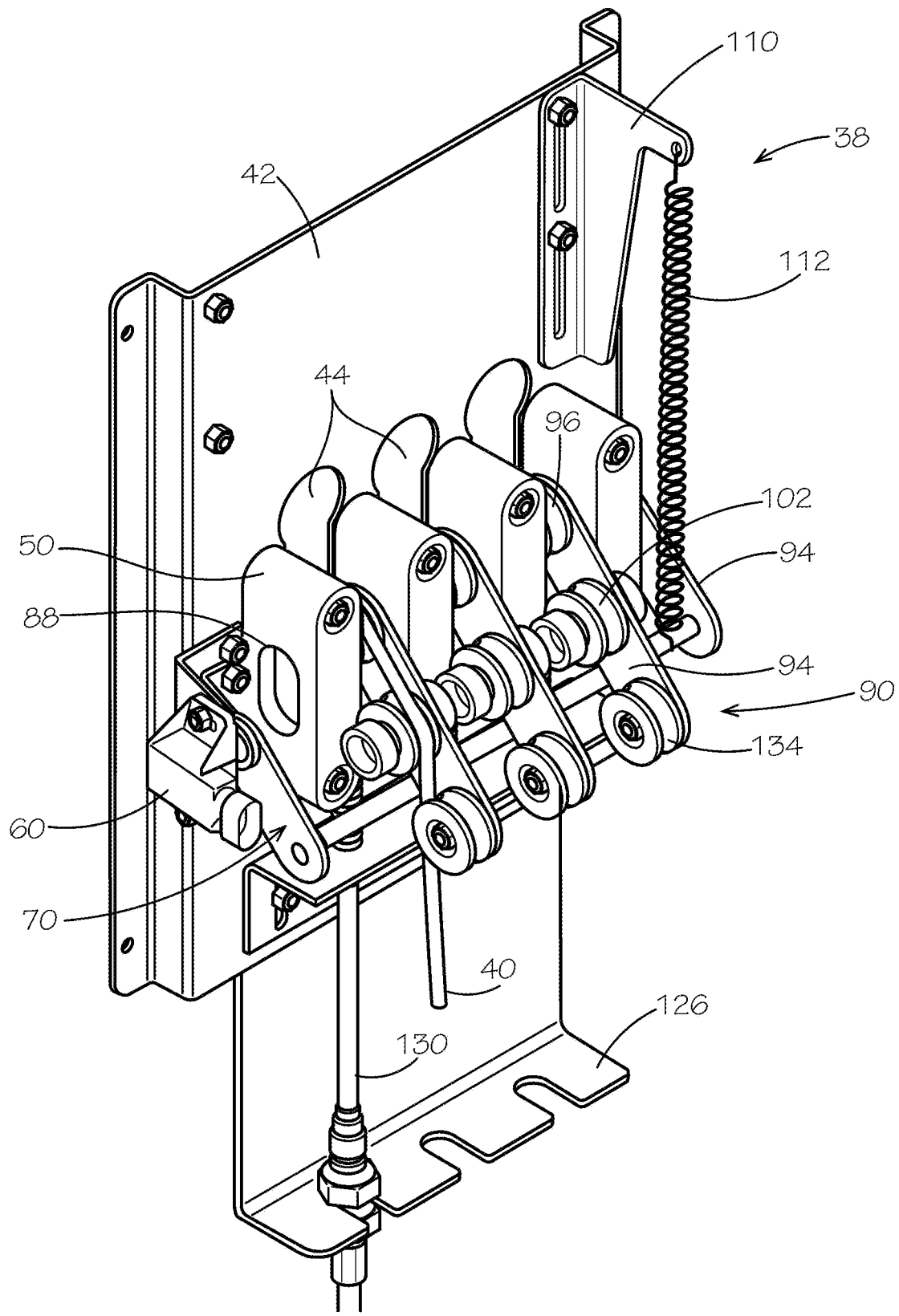
FIG. 11 shows a perspective view of the twine tension measurement assembly of FIG. 7 in which the strand of twine is running at a high tension level.
Figure 12:
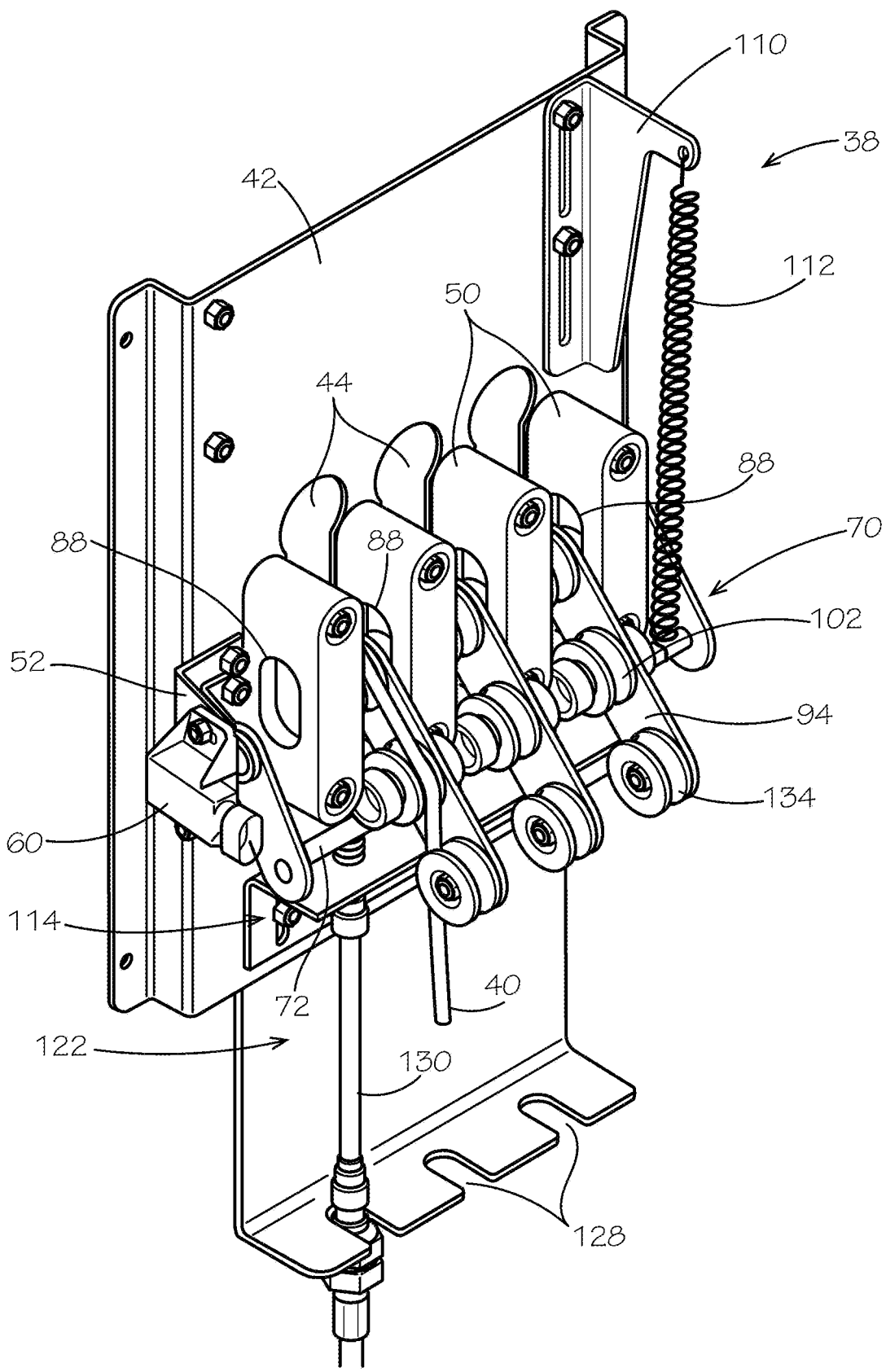
FIG. 12 shows a shows a perspective view of the twine tension measurement assembly of FIG. 7 in which the strand of twine is running at a cut of triggering level.

As best seen in FIGS. 8 and 10, the first support bracket 52 comprises an inner support surface 56 and an outer support surface 58. A potentiometer 60 is mounted on the outer support surface 58 such that a shaft of the potentiometer 60 extends through an opening in the outer support surface 58.

The inner support surface 56 is provided with an opening, conveniently aligned with the opening in the outer support surface 58.

The second support bracket 52 comprises a first support surface 62. An opening in the first support surface 62 of the second support bracket 52 is aligned with the opening in the inner support surface 56 of the first support bracket 50.

A guide element 70 is mounted between the first and second support brackets 52,54. The guide element 70 comprises a cross member 72 having first and second ends. Each of the first and second ends is connected to a second end of an arm 74,76. A first end of each arm 74,76 is provided with an outwardly directed stub 78,80. At a first end of the guide element 70 the stub 78 extends through the opening in the second support surface 56 of the first support bracket 52 and is connected to the potentiometer shaft in any suitable manner between the first and second support surfaces 56,58 of the first support bracket 52. At a second end of the guide element 70 the stub 80 extends through the opening in the support surface 62 of the second support bracket 58. The respective stubs 78,80 are mounted for rotation in their respective openings. A first generally horizontal axis of rotation is defined extending through the openings in the first and second support brackets 52,54. The potentiometer 60 generates a signal indicative of the angular displacement of the guide element 70. This signal is received by the control unit 32. Movement of the guide element 70 will cause the potentiometer shaft to rotate and so signals indicative of the changing angular position of the guide element 70 to be generated. It will be understood that the potentiometer may be substituted for other suitable apparatus for converting this angular movement into an electrical signal.

Figure 7:
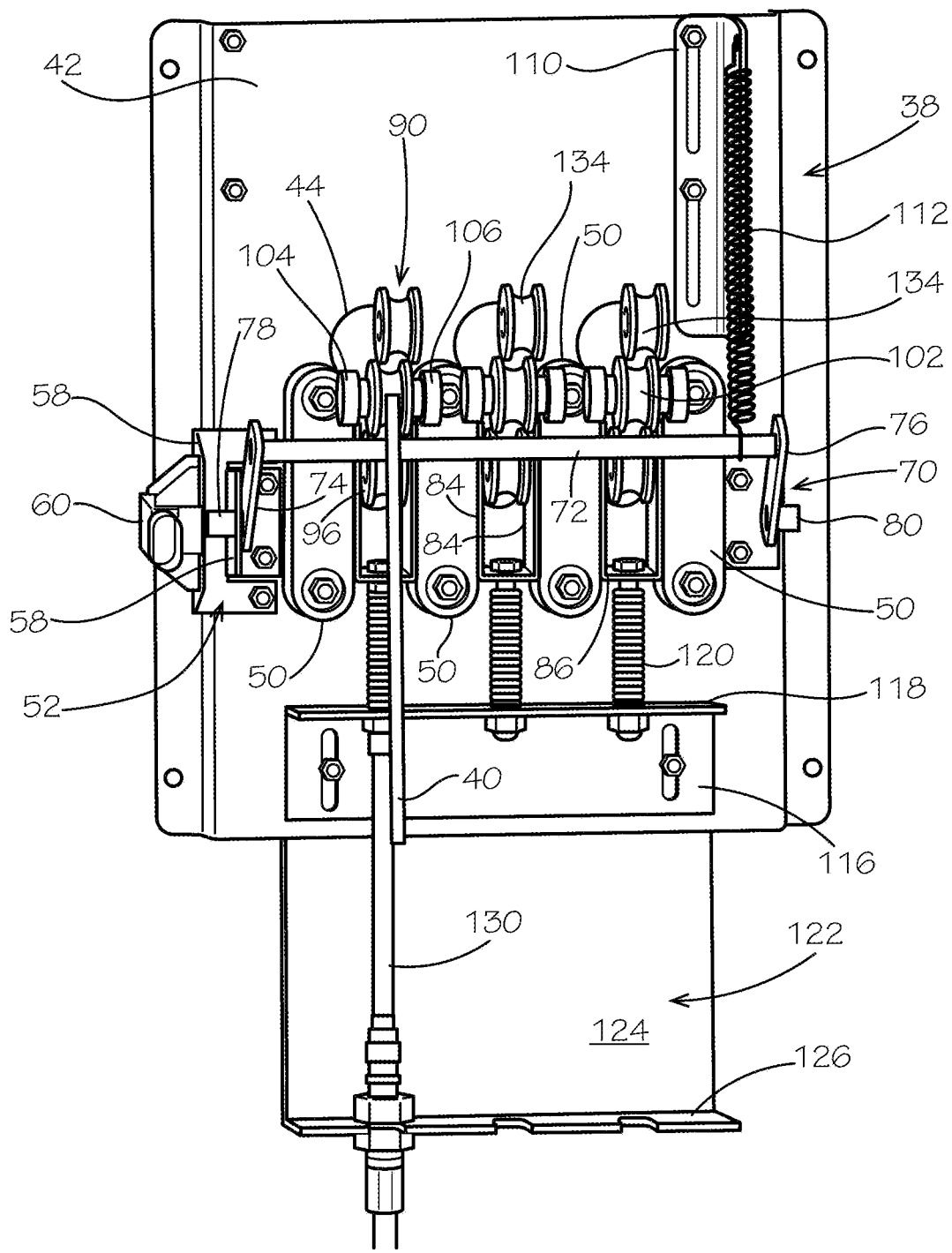
FIG. 7 shows a generally frontal view of a second embodiment of a twine tension measurement assembly in accordance with the present invention in which a strand of twine is running at a relaxed tension level.

U-shaped brackets 82 are mounted between each pair of housings 50 (cf FIG. 7). Each U-shaped bracket 82 comprises upwardly extending side limbs 84 to either side of a central lower cross limb 86. The lower cross limb 86 of each U shaped bracket 82 is provided with an opening.

A pivotable elongate element 90 is provided between each pair of housings 50. Each elongate element 90 is substantially similar such that only one will be described. In the first embodiment of FIGS. 3 to 6, each pivotable elongate element 90 comprises first and second side elements 92,94. A first pulley or roller 96 is mounted at a first end of the pivotable elongate element 90. The first pulley 96 is disposed on a second axis of rotation extending though the housings 50. The second axis of rotation is located above and behind the first axis of rotation. The first pulley 96 is mounted between the upper ends of the side limbs 84 of the respective U-shaped bracket 82.

Stops 98,100 are provided to each side of the U shaped bracket 82 in line with the first pulley 96. Each stop 98,100 is preferably generally cylindrical in shape. The stops 98,100 and the first pulley 96 may conveniently be mounted on a common axle extending through the upper ends of the side limbs 84 of the U-Shaped bracket 82. The stops 98,100 are adapted to be seated within the guide tracks 88 of the adjacent housings 50. Preferably the housings 50 are formed of a polymeric material. The stops 98,100 are formed of any suitable material, for example a metal such as steel.

In a mid-region of each pivotable elongate element 90, the pivotable elongate element 90 is also provided with a second rotatable pulley or roller 102. To each side of the second rotatable pulley 102, further first and second stops 104,106 are mounted. Each further stop 104,106 is preferably generally cylindrical in shape. The further stops 104,106 and the second pulley 102 may conveniently be mounted on a common axle.

An upper bracket 110 is shown to one side of the generally planar front vertical portion of the mounting bracket 42. The upper bracket 110 provides a mounting point spaced from the generally planar front vertical portion of the mounting bracket 42. Biasing means are provided between the mounting point and one end of the guide element 70 to bias the guide element 70 into a raised position. In the illustrated embodiment, a first biasing element comprises a helical spring 112 extending between the mounting point and one end of the cross member 72 of the guide element 70. In an alternative, less preferred, embodiment (not shown) a second support bracket may be provided on the other side of the mounting bracket with a second helical spring extending between a corresponding mounting point and the other end of the cross member 72 of the guide element 70.

The mounting bracket 42 is also provided at a lower end of the generally planar front vertical portion with a flange plate 114. The flange plate 114 is substantially L-shaped with a first limb 116 secured to the mounting bracket and a second limb 118 extending outward substantially orthogonally thereto. The second limb 118 is provided with a plurality of openings. The openings in the flange plate 114 are aligned vertically with the openings in the lower cross limbs 86 of the U-shaped brackets 82. A second biasing means is located between each set of flange plate and U-shaped bracket openings. The second biasing means urges the U-shaped bracket and so the first end of the pivotable elongate element 90 upwards. The second biasing means takes the form of a compression spring 120 forming part of a cable release mechanism 130.

A lower bracket 122 is also secured to a lower portion of the generally planar front vertical portion of the mounting bracket 42. The lower bracket 122 is substantially L-shaped with a first limb 124 secured to a surface of the mounting bracket 42 and a second limb 126 extending outward substantially orthogonally thereto and beneath the second limb 118 of the flange plate 114. The second limb 126 of the lower bracket 122 is provided with a plurality of cutaway portions 128, each of the cutaway portions 128 being substantially vertically aligned with one of the openings in the second limb 118 of the flange plate 114. Each of the cutaway portions 128 serves as a mounting point for the respective cable release mechanism 130.

Each cable release mechanism 130 extends between a knife mechanism 132 and the twine tension measurement assembly 38. The cable of the cable release mechanism 130 extends through the second biasing means with an end of a cable (not shown) of the cable release located within a respective U-shaped bracket. The cable is attached to the lower cross limb 86 of each U-shaped bracket 82 by a nut on each side of the lower cross limb 86 so the lower cross limb 86 controls the position of the cable.

In FIGS. 3 to 6, a strand of twine 40 is shown extending through a twine path defined by elements of the twine tension measurement assembly 38. The strand of twine 40 initially extends upwards through one of the apertures 44 in the generally planar front vertical portion of the mounting bracket 42 and over an upper surface of the first pulley 96 in one of the pivotable elongate elements 90, before exiting the twine tension measurement assembly 38 around the second pulley 102 and proceeding onward to the knotter mechanism.

In FIG. 3, in the absence of tension in the strand of twine 40, the first biasing element holds the guide element 70 in a raised position. The cross member 72 of the guide element 70 thus holds the elongate elements 90 in a raised position.

Figure 4:
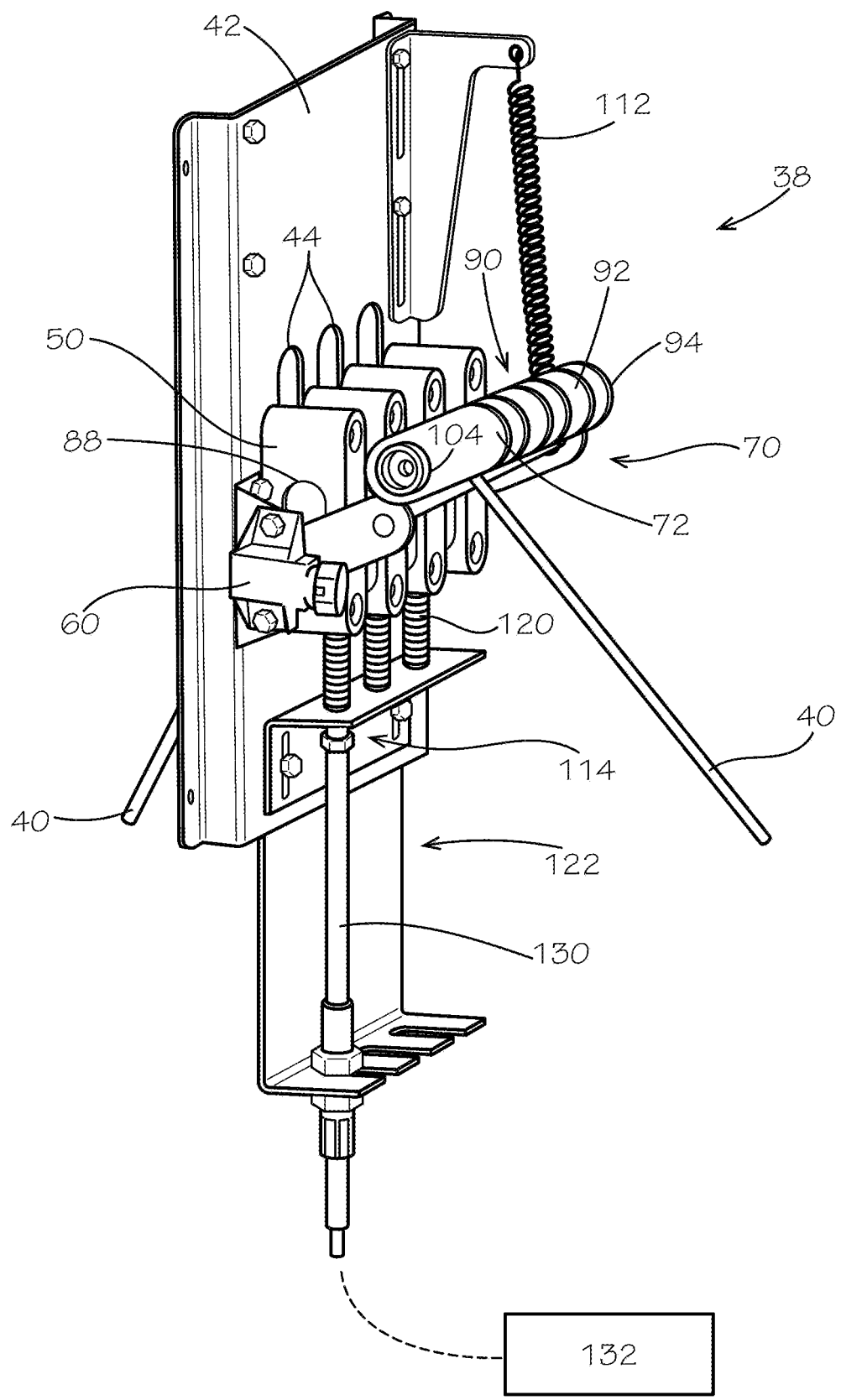
FIG. 4 shows a corresponding perspective view of the twine tension measurement assembly of FIG. 3 in which the strand of twine is running at a low tension level.

In the low tension situation of FIG. 4, it can be seen that the tension in the strand of twine 40 has pulled the second pulley 102 downward about the second axis of rotation, against the action of the first biasing element. This causes a lower surface of the elongate element 90 to push against the cross member 72 of the guide element 70 pivoting the guide element 70 about the first axis of rotation. This movement of the guide element 70 is reflected by the potentiometer generating a signal to the control unit indicative of the position of the guide element 70. It will be seen that the position of the guide element 70 depends on the tension the strand of twine 40 and so position of the guide element 70 is a measure of the tension in strand of twine 40.

Figure 5:
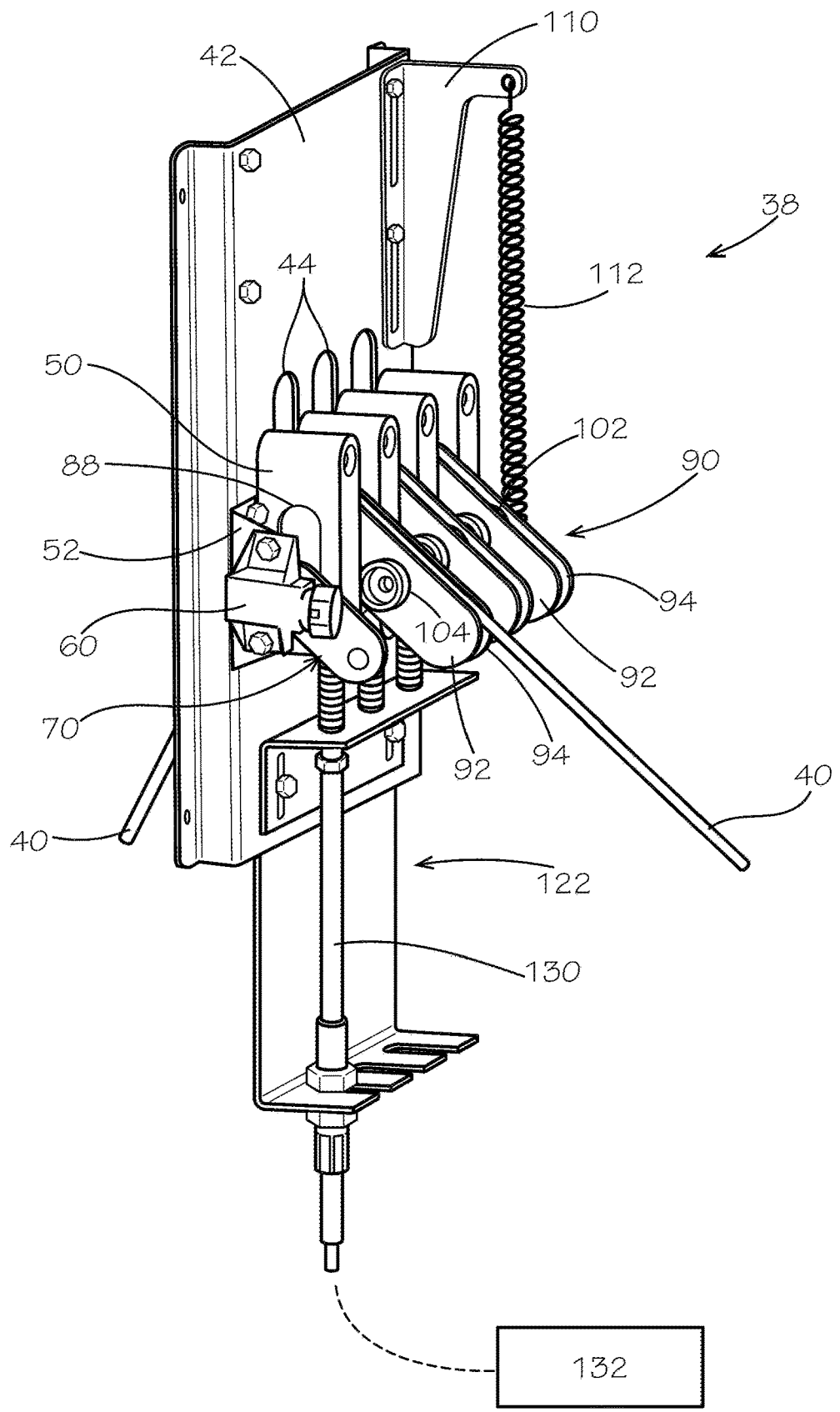
FIG. 5 shows a corresponding perspective view of the twine tension measurement assembly of FIG. 3 in which the strand of twine is running at a high tension level.

In the high tension scenario of FIG. 5, where the tension in the strand of twine 40 while greater than that in FIG. 4 remains below that requiring action to be taken to avert potential damage to the knotter mechanism, the tension in the strand of twine 40 has caused the elongate element 90 and so the guide element 70 to be pivoted almost to their full extent about their respective axes. As before, the position of the guide element 70 will be detected by the potentiometer 60 which will send a signal to the control unit indicative of the level of tension in the strand of twine 40.

Figure 6:
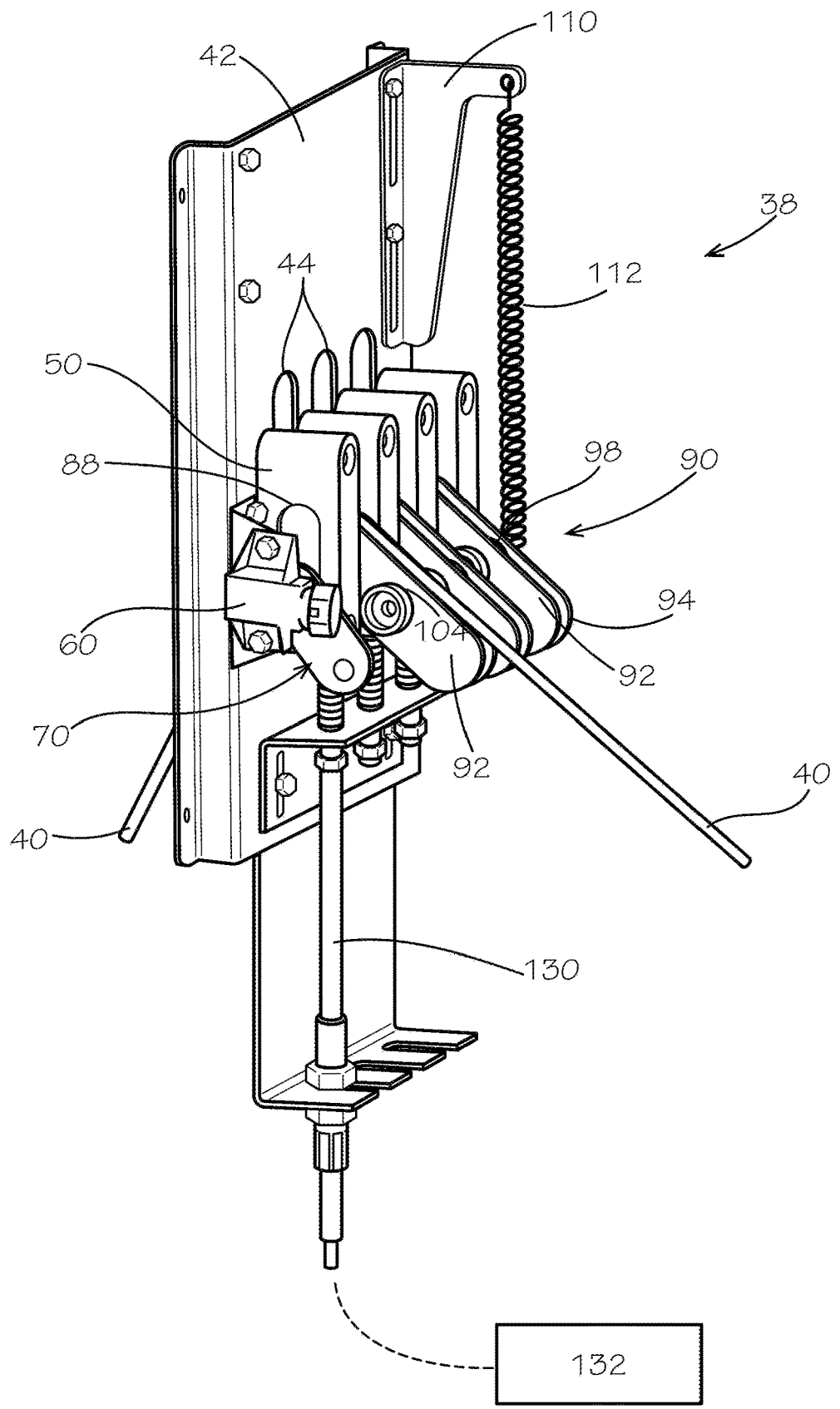
FIG. 6 shows a corresponding perspective view of the twine tension measurement assembly of FIG. 3 in which the strand of twine is running at a cut off triggering level.

In the cut-off position illustrated in FIG. 6 the tension in the strand of twine 40 has caused the elongate element 90 and so the guide element 70 to be pivoted about their respective axes to their full extent. Further angular movement of the elongate element 90 is prevented by abutment of the further 104,106 stops on an outer surface of the adjacent housings 50. Additional tension in the system of the twine tension measurement assembly 38 will cause the elongate element 90 to be shifted downwards. The stops 98,100 will be guided in the guide tracks 88 and the U-shaped bracket 82 displaced against the second biasing means. The movement of the lower cross limb 86 of the U-shaped bracket 82 displaces the cable of the cable release mechanism 130 thereby causing actuation of the knife mechanism 132 to cause severing of the strand of twine 40.

It will be understood that the second biasing means will be chosen to ensure that downward shifting of the elongate element 90 to the cut-off position does not occur until an undesirable tension has arisen in the twine tension measurement assembly.

Figure 13:
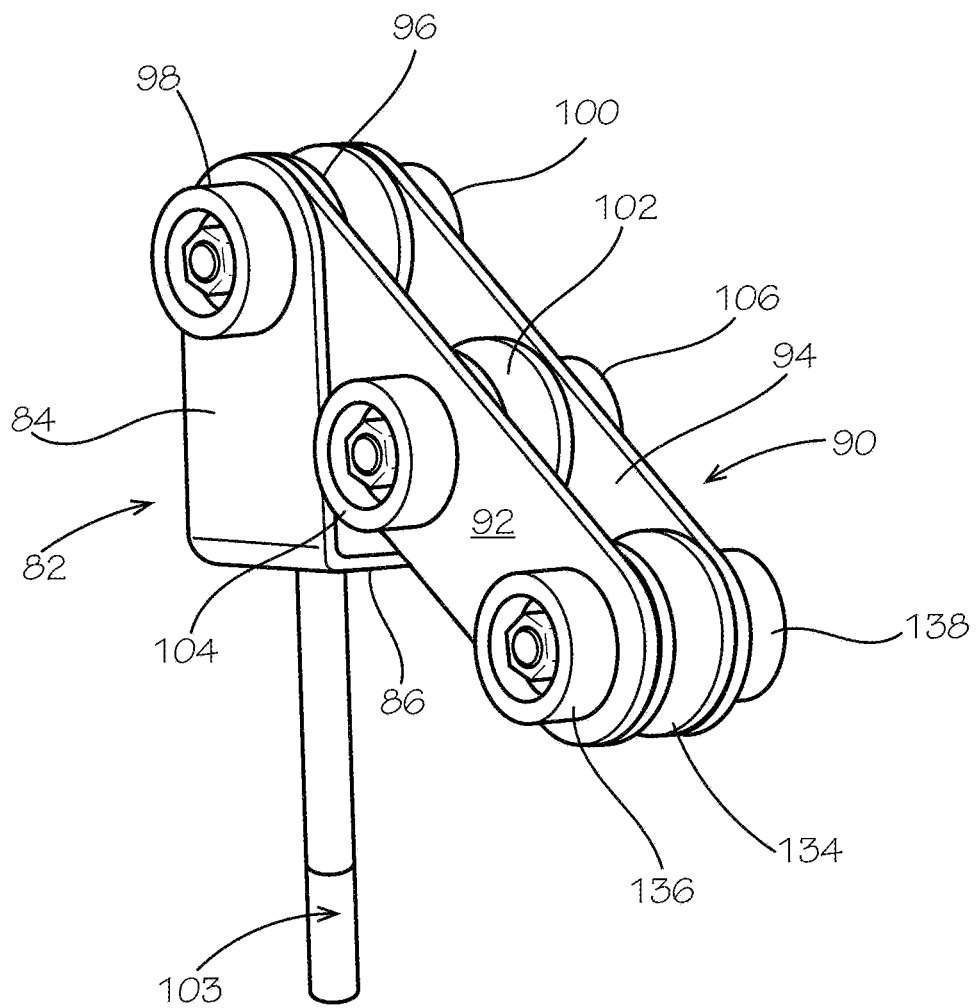
FIG. 13 shows a perspective view of certain elements of the twine tension measurement assembly of FIG. 7.
Figure 14:
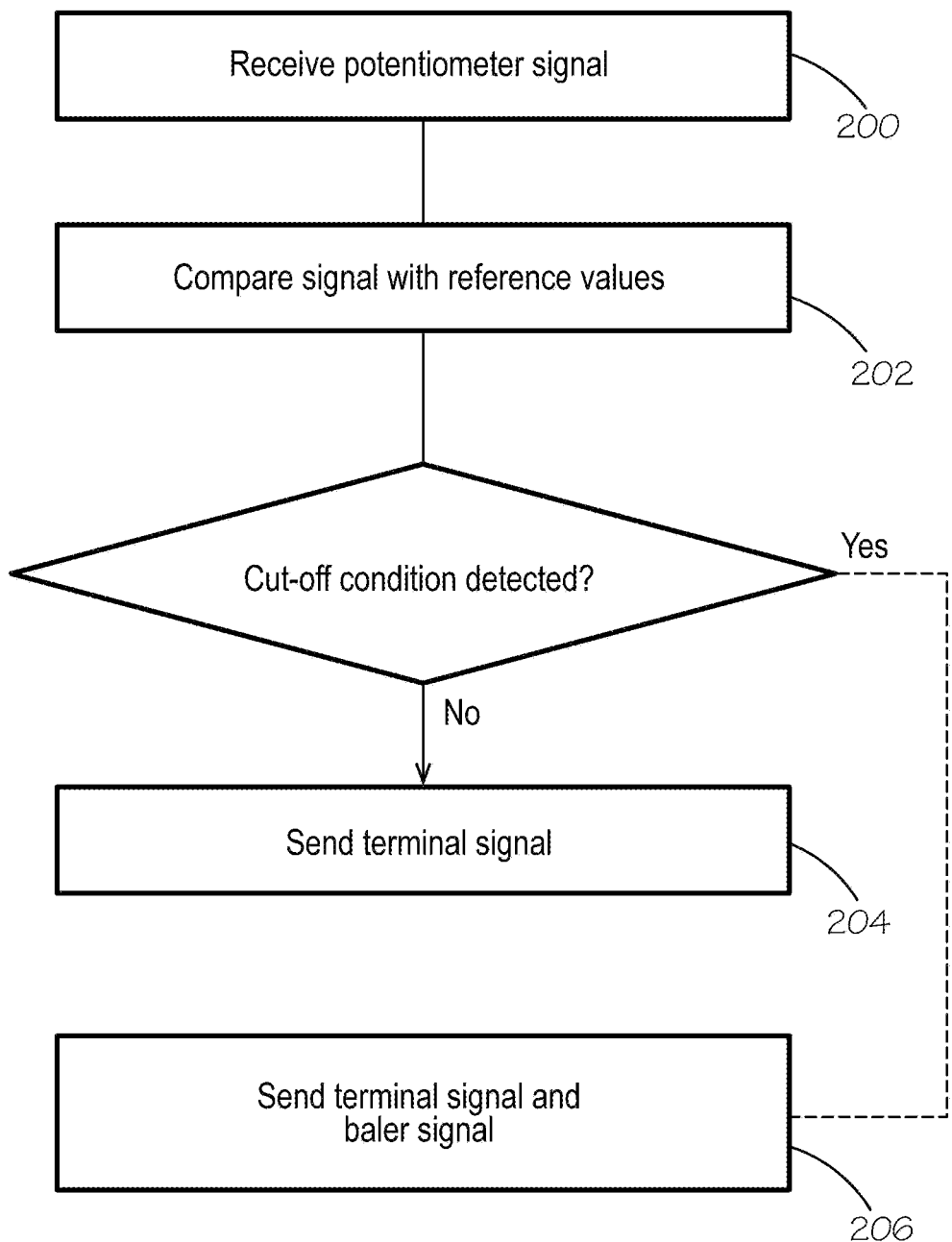
FIG. 14 shows a flow diagram illustrating an aspect of a method of operation of a tractor and baler combination incorporating either embodiment of the twine tension measurement assembly according to the invention.

The signals from the potentiometer 60 are received by the control unit 32 (step 200, FIG. 13). These signals are compared against reference values held in the memory 36 (step 202). The reference values represent values of the tension detected in the twine tension measurement assembly. The control unit 32 then sends a terminal signal to the user terminal 30 based upon the reference value corresponding to the potentiometer signals (step 204).

The user terminal 30 receives the terminal signal and indicates the tension level in the relevant twine tension measurement assembly to the operator in any suitable manner, for example by way of a visual signal and/or an audible signal. The visual signal may, by way of example, take the form of an icon or series of icons displayed on the user terminal 30. The audible signal may, by way of example, take the form of a tone or spoken message issuing from the user terminal 30.

The user terminal 30 will indicate an elevated tension condition using different visual signals and/or different audible signals.

If the tension is sufficiently elevated to cause the strand of twine 40 to be cut, and as a result the tension is released in the twine tension measurement assembly, the guide element 70 will return to its initial position under the action of the spring 112.

In a preferred embodiment, once the strand of twine 40 has been cut, the electronic control unit 32 on receipt of a potentiometer signal corresponding to a cut off condition (for example very high tension followed by no tension) may optionally also generate a signal to cause the operation of the baler 12 to cease (step 206). For example a signal may be sent to disengage a clutch 140 located between the PTO 18 and the reciprocating plunger 28 thereby preventing further bale formation. A suitable signal may also be sent to the user terminal to alert the operator to this action being taken.

Only one strand of twine 40 is shown in FIGS. 3 to 6. In practice several strands of twine may extend through the twine control assembly, each stand passing through a respective aperture and around a respective elongate element as described above. Each elongate element may be adapted to pivot independently of the others.

It will be appreciated that in this embodiment, the signals to the operator from the user terminal will reflect the tension levels in a set of strands of twine and that one of the set of strands of twine has been cut without identifying the strand of twine that has been cut.

Alternatively the elongate elements may be coupled together as a set. In this case, the highest tensioned strand will cause the set of elongate elements to move together against the guide element. The individual cable releases will be released together when the guide element is rotated to a position in which the stops of the elongate elements are displaced within the guide tracks 88 to cause cutting of the strands of twine. As before the signals to the operator will reflect the tension levels in a set of strands of twine and that a set of strands of twine have been cut.

In a second embodiment of the present invention shown in FIGS. 7 to 13, the pivotable elongate elements 90 are provided at a second end with a third pulley 134. The third pulley 134 need not be rotatable and is mounted between the side elements 92,94 of each pivotable elongate element 90. Further stops 136,138 may be provided. Each further stop 136,138 is preferably generally cylindrical in shape. The further stops 136,138 and the third pulley 134 may conveniently be mounted on a common axle.

In some circumstances a strand of twine comprises first and second portions of twine joined by a knot, for example when twine from sequential twine bales are joined. Sometimes the size of the knot will cause problems in the knotter mechanism. It is an advantage of this second embodiment that it prevents such knots from reaching the knotter mechanism.

In the second embodiment the twine path follows that of the first embodiment, with a strand of twine 40 entering the twine measurement assembly 38 through one of the apertures 44, passing over a first pulley 96 and then over a second pulley 102 of a elongate element 90 before passing out of the twine tension measurement assembly 38. However in doing so it will be appreciated that the strand of twine 40 now passes through a volume defined between the second and third pulleys 102,134 and the side elements 92,94 of the elongate element 90. Should the knot be too large to pass though this volume, the strand of twine 40 will snag causing the elongate element 90, along with the guide element 70, to be pivoted to the cut-off position of FIG. 12, the movement of the elongate element 90 to this position causing the strand of twine 40 to be severed by actuation of the knife mechanism 132 before the knot can reach and damage the knotter mechanism.

From reading the present disclosure, other modifications will be apparent to persons skilled in the art. Such modifications may involve other features which are already known in the field of square balers and component parts therefore and which may be used instead of or in addition to features already described herein.

The invention claimed is:

1. A baler twine tension measurement assembly comprising:
   a displacement detector,
   a first pulley and a second pulley defining a first twine path,
      wherein the first twine path extends between a first location and a second location, wherein the second location is angularly displaceable with respect to the first location, and the displacement detector is configured to generate a signal indicative of the angular displacement of the second location with respect to the first location,
      wherein the first location comprises the first pulley located at a first end of an elongate element and the second location comprises the second pulley located on the elongate element, spaced from the first pulley, and
   a biased armature guided by movement of the elongate element, wherein the biased armature is connected to the displacement detector.

2. The baler twine tension measurement assembly of claim 1, wherein the first twine path further extends between the second location and a third location spaced from the second location.

3. The baler twine tension measurement assembly of claim 2, wherein the third location comprises a third pulley located on the elongate element, spaced from the first pulley and the second pulley.

4. The baler twine tension measurement assembly of claim 1, wherein the displacement detector comprises a potentiometer.

5. The baler twine tension measurement assembly of claim 1, wherein the biased armature is biased towards a first position of the armature by a biasing element extending between a mounting position of the armature and a free end of the armature.

6. The baler twine tension measurement assembly of claim 5, wherein the biasing element is a helical spring.

7. The baler twine tension measurement assembly of claim 1, further comprising additional twine paths in parallel to the first twine path, wherein each of the additional twine paths extends between a first fixed location and an associated second displaceable location wherein the associated second displaceable location is angularly displaceable with respect to the first fixed location, and the displacement detector is configured to generate a signal indicative of a furthest angular displacement of the displaceable locations.

8. A twine tension control system comprising:
   the baler twine tension measurement assembly of claim 1,
   a controller which receives the signal from the twine tension measurement assembly; and
   a knife mechanism actuable in response to a predetermined displacement of the first location from a first position.

9. The twine tension control system of claim 8, wherein the twine tension measurement assembly further comprises:
   a plurality of housings comprising guide channels; and
   guides aligned with the first location and configured for movement with the guide channels.

10. The twine tension control system of claim 9, wherein the twine tension measurement assembly further comprises a second biasing means to bias the first location to the first position.

11. A combination comprising:
    an agricultural vehicle; and
    a baler towed by the agricultural vehicle,
    wherein the baler comprises:
      a plurality of knotter assemblies; and
      one or more of the twine tension measurement assemblies of claim 1 associated with one or more of the plurality of knotter assemblies.

12. The combination of claim 11, further comprising:
    a control unit;
    memory in communication with the control unit; and
    a user terminal in communication with the control unit,
    wherein the control unit is configured to receive the signals from each of the baler twine tension control assemblies,
    compare the signals against a predetermined set of values stored in the memory,
    determine and transmit a terminal signal to the user terminal wherein the user terminal is configured to indicate a status of the twine tension measurement assembly that caused the terminal signal.

13. The combination of claim 12, wherein the control unit is further configured so that when one of the signals from the twine tension control assemblies corresponds to a cut-off value, the control unit sends a cut-off signal to cause operation of the baler to cease.

14. The combination of claim 12, wherein the user terminal indicates which of the twine tension measurement assemblies caused the terminal signal by either a visual or audible indication or by both the visual and audible indications.

15. The combination of claim 12, wherein the control unit comprises a processor located on the baler.

16. The combination of claim 12, wherein the control unit comprises a processor on the baler in communication with a processor on the agricultural vehicle.

17. The combination of claim 12, wherein the control unit comprises a processor located on the agricultural vehicle.

* * * * *